March 21, 1967 D. A. LEE 3,309,961
HERMETICALLY SEALED EXPLOSIVE RELEASE MECHANISM
Filed June 30, 1964

David A. Lee,
INVENTOR

United States Patent Office 3,309,961
Patented Mar. 21, 1967

3,309,961
HERMETICALLY SEALED EXPLOSIVE RELEASE MECHANISM
David A. Lee, Inglewood, Calif., assignor, by mesne assignments, to the United States of America as represented by the Administrator of the National Aeronautics and Space Administration
Filed June 30, 1964, Ser. No. 379,072
1 Claim. (Cl. 89—1)

This invention relates to a hermetically sealed explosive release mechanism and more particularly to an explosively actuated release device capable of transmitting high tension loads prior to its operation, and providing an extremely fast and reliable separation with no fragments, gases, or contaminants of any nature released during operation. Thus, the present invention may be used in close proximity to delicate and easily damaged devices, such as space vehicles, solar cells and other fragile or contamination sensitive articles without hazard or damage. The device may also be used safely in an explosive atmosphere.

While explosively actuated pin pullers and similar release mechanisms have been used in the past, these devices have used elastomeric or similar resilient seals of a sliding nature to contain the products of combustion. These seals do not perfectly contain the gases, as some leakage is permitted or occurs during the rapid increase in pressure common to explosive reactions.

Certain explosively actuated devices, such as safety and arming devices, and other mechanisms including electrical switches, have been actuated by means of a bellows or dimple motor, which is pressurized and forced to deform by an explosive, but these devices yield relatively low force, since the explosive pressure must be low enough to yield the metal without causing a fracture or leakage.

One arming device for a fuse utilizes a preformed deformable metallic diaphragm having a complex shape consisting of two concentric, reversely curved, annular portions, which are subsequently deformed, after a long travel driving a cylindrical member, into a frusto-conical shape. This type of diaphragm, however, is subject to fracture during deformation and possible leakage during actuation of the device.

Briefly stated, one preferred embodiment of the present invention consists of a body which may be secured to one end of a cable or to a fixed support. The body is provided with a pressure chamber into which one or two explosive cartridges are inserted. The pressure chamber is closed off by a flat or frusto-conical diaphragm which has a large area in contact with a piston mounted in a cylinder formed in the body. The piston engages the head of a stud or bolt which is retained in a body by an annular shear disc or retainer ring. When either or both of the explosive cartridges are ignited, resulting in pressurization of the chamber, the diaphragm exerts a uniform pressure against the piston moving it outwardly and forcing the stud or bolt to shear the disc, which retains it inside of the body so that the opposite end of the cable, which may be secured to the bolt, is released rapidly and reliably. During the entire operation, the diaphragm is completely backed up by the piston except for a small peripheral portion which is deformed against an annular beveled edge in the body adjacent to the inner end of the cylinder, so that exceedingly high pressures may be generated to shear the retaining disc, thus permitting the device to withstand extremely high tension prior to release. After the diaphragm has been moved a short distance sufficient to shear the retaining disc, the entire diaphragm is backed up by the piston and the annular beveled edge of the cylinder, so that it is unable to deform any further and does not require great mechanical strength to contain the pressures from the explosive cartridges.

One object of the present invention is to provide a hermetically sealed explosive release mechanism which is capable of transmitting high tension loads prior to its operation and provide an extremely fast reliable manner of operation during release.

Another object of the present invention is to provide an explosively actuated release device in which no fragments, gases, or contaminants of any nature are released to damage delicate articles or other fragile or contamination sensitive devices nearby.

Other objects and many of the attendant advantages of this invention will be readily appreciated as the same become better understood by reference to the following detailed description, when considered in connection with the accompanying drawings, wherein.

Figure 1:
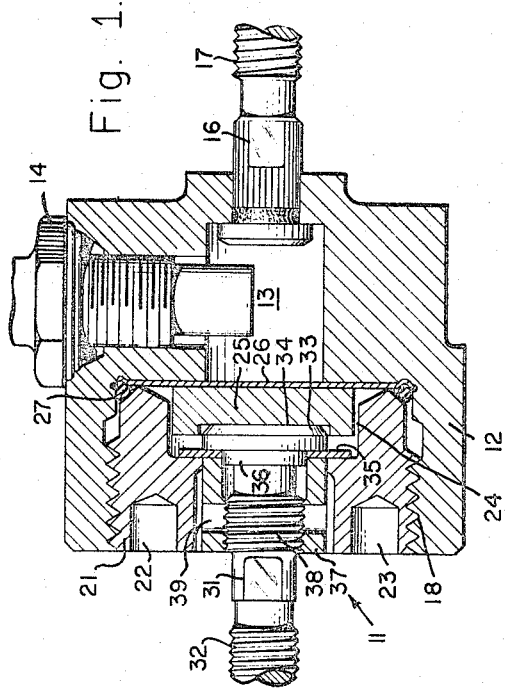
FIG. 1 is a longitudinal sectional view taken on line 1—1 of FIG. 2 and illustrating one preferred embodiment of the present invention.

Referring now to the drawings in detail, and more particularly to FIG. 1, the explosive release mechanism 11 in one preferred embodiment consists of a generally cylindrical body 12 having a pressure chamber 13.

Figure 2:
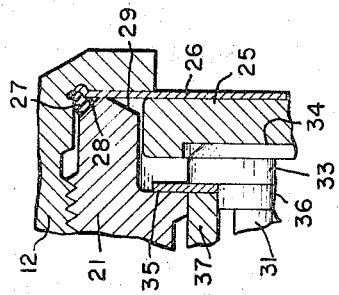
FIG. 2 is an end view of the device illustrated in FIG. 1.

The body is provided with two radial openings into which the two explosive cartridges or detonators 14 and 15 are inserted, as indicated in the end view of FIG. 2.

An axial opening in one end of the body 12 receives the bolt 16 which may be sealed in position by an epoxy or other suitable adhesive. The bolt 16 may be provided with threads, as indicated at 17 to engage a fitting at one end of an elongated cable (not shown). However, the body 12 may be attached to a rigid or solid supporting structure by any suitable means.

A larger threaded axial opening 18 in an opposite end of the body 12 receives a threaded retainer nut 21 which is provided with a plurality of openings or recesses, such as those shown at 22 and 23, for engagement by a spanner wrench.

The inner end of the retainer nut 21 is bored out to form a cylinder 24 positioned axially in the body to receive a piston 25. The inner end of the retainer nut also engages the metal diaphragm 26 to hold it firmly in position against the body 12. An O-ring 27 may be positioned to engage a chamfered or beveled edge 28 formed on the nut 21 to provide a tight seal which will prevent escape of gases, after actuation of explosive cartridges 14 and 15. The nut 21 is also chamfered around the inner end of cylinder 24 to provide a chamfered annular portion 29 adjacent the peripheral portion of diaphragm 26. This detail is clearly shown in FIGS. 3, 4, and 5 on a larger scale.

Another bolt or stud 31 is likewise provided with threads 32 for engagement with a suitable fitting on the opposite end of a cable (not shown), or any other device which it may be desired to release.

The stud 31 has an enlarged head 33 which sets into a recess 34 in the outer end of the piston 25. The head 33 engages a retainer ring or disc 35 which fits snugly around a collar 36 formed on the bolt 31 and is secured in position by the nut 37 which threads on to the shank 38 of the bolt 31. Nut 37 is provided with radial recesses 39 which may also be engaged by a spanner wrench for tightening on the bolt 31.

*Operation*

In the operation of the explosive release mechanism of the present invention the two explosives cartridges 14 and 15 are inserted in the openings in the body 12 leading into the pressure chamber 13. Fittings on the opposite ends of a cable, for example, may be attached to the threaded ends 17 and 32 of the bolts 16 and 31. However, these bolts 17 and 31 may be attached to any other device which it is desired to release, or the body may be rigidly attached to some supporting structure and the explosive release mechanism used to actuate any desired movable element.

The detonators or explosive cartridges 14 and 15 may be suitably connected by means not shown to any conventional timing mechanism or electrical actuator, for example, on a spacecraft or missile where the cable may be utilized for holding two stages together until separation is desired. However, the explosive release mechanism of the present invention obviously has many other applications both in space and on the ground where it is desired to actuate or release the mechanism by remote control with safety and reliability.

Figure 4:
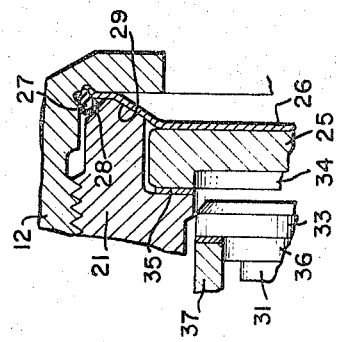
FIG. 4 is a fragmentary sectional view illustrating the distortion of the diaphragm, after actuation of the explosive cartridge, during its initial movement.
Figure 5:
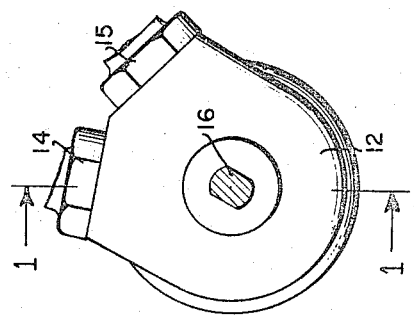
FIG. 5 is a view similar to FIGS. 3 and 4 illustrating the final position of the diaphragm and piston after the retainer ring has been sheared and the bolt is being ejected from the body.
Figure 3:
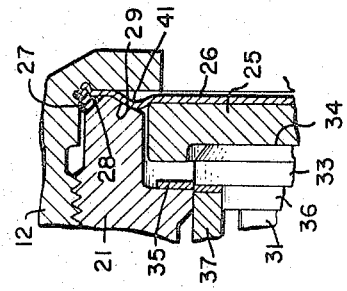
FIG. 3 is a fragmentary sectional view on a larger scale illustrating the initial positions of the diaphragm, piston, bolt, and retainer ring.

The sequence of operation and the movement of the diaphragm 26, piston 25, and the head 33 of the bolt 31 to shear the annular retaining ring 35 is clearly shown in the sequence of FIGS. 3, 4, and 5.

In FIG. 3, the parts are shown on their initial assembled position In FIG. 4, the diaphragm 26 has started to deform and move the piston 25 and the retainer or annular ring 35 has already been sheared into two concentric annular rings. As indicated in FIG. 4, most of the deformation of the diaphragm 26 takes place against the chamfered or beveled edge 29 of the retainer nut 21, as indicated by the arrow 41. It will be apparent that the retainer ring 35 is held on the collar 36 by the nut 37, pressing tightly against the head 33 of the bolt 31.

In the final view of FIG. 5, the diaphragm 26 is fully deformed but is backed up by the piston 25 and the beveled edge 29, so that there is no great stress on the diaphragm itself and therefore shearing or cracking of the diaphragm 26 is almost impossible Leakage of the exhaust gases is effectively prevented by the O-ring 27 which forms a seal between the chamfered edge 28 of the retainer 21 and the corner of the body 12 adjacent thereto which presses against the peripheral edge of the diaphragm 26.

It will be apparent that the explosive release mechanism of the present invention may be modified by providing a duplicate of the release mechanism shown on the left of FIG. 1 in place of the solid bolt 16 to the right, so that both ends of the cable may be released simultaneously. The diaphragm 26 may also be formed as a frusto-conical disc which has its convex side initially extending into the pressure chamber 13 and buckles or snaps through after the explosive cartridges 14 and 15 are actuated to the opposite position shown in FIG. 5. This action is similar to the movement of the bottom of an oil can and the action will be very rapid without failure of the material of which the diaphragm 26 is formed.

If the body 12 is rigidly secured to some supporting structure and the end of the cable attached to the bolt 31, the explosive cartridge may obviously be inserted in an axial opening in place of the bolt 16 or in any other convenient location as long as it extends into the pressure chamber 13. Although two explosive cartridges 14 and 15 have been indicated for the purpose of assuring action in case either one fails, a single detonator may be adequate and sufficiently reliable, and one detonator is sufficient to actuate the release mechanism in any case.

Obviously many other modifications and variations of the present invention may be made within the scope of the following claim.

The embodiments of the invention in which an exclusive property or privilege is claimed are defined as follows:

A hermetically sealed explosive release mechanism comprising:
- a body having a pressure chamber therein;
- a retaining shoulder at one end of said pressure chamber;
- an elongated member having an enlarged head portion in said body;
- an annular retaining ring interposed between and engaging said shoulder and enlarged head portion;
- a piston in said pressure chamber engaging said enlarged head portion, said piston being spaced from and adapted to be stopped by said retaining shoulder;
- a diaphragm attached to said body and engaging said piston, said diaphragm extending across said pressure chamber to prevent passage of gas therefrom;
- a bevelled support adjacent the point of attachment of said diaphragm to said body to support said diaphragm upon pressurization of said pressure chamber,
- a retainer nut mounted in said body and having a bore for accommodation of said elongated member, said nut forming said retaining shoulder, said diaphragm being supported my said body and said retaining nut;
- whereby when said pressure chamber is pressurized, said diaphragm and piston is adapted to force said elongated member against said annular retaining ring to shear said ring and allow said elongated member to separate from said housing, said piston being stopped by said shoulder to support said diaphragm.

References Cited by the Examiner

UNITED STATES PATENTS

| | | |
|---|---|---|
| 2,061,835 | 11/1936 | Haines. |
| 2,830,539 | 4/1958 | Cecil _____ 89—1 X |
| 3,119,302 | 1/1964 | Barr _____ 89—1 |
| 3,169,443 | 2/1965 | Stott _____ 89—1 |

BENJAMIN A. BORCHELT, *Primary Examiner.*

SAMUEL FEINBERG, *Assistant Examiner.*